(12) United States Patent
Barza et al.

(10) Patent No.: US 12,169,451 B1
(45) Date of Patent: Dec. 17, 2024

(54) USABILITY CLICK TRACKING WITH NAVIGABLE CLICK PATHS

(71) Applicant: Wevo, Inc., Boston, MA (US)

(72) Inventors: Alexander Barza, Cambridge, MA (US); Frank Chiang, Boston, MA (US); Dustin Garvey, Exeter, NH (US); Charlie Hoang, Boston, MA (US); Laryssa Costa De Souza, Boston, MA (US); Jessica Yau, Boston, MA (US)

(73) Assignee: Wevo, Inc, Boston, MA (US)

( * ) Notice: Subject to any disclaimer, the term of this patent is extended or adjusted under 35 U.S.C. 154(b) by 0 days.

(21) Appl. No.: 18/392,803

(22) Filed: Dec. 21, 2023

(51) Int. Cl.
*G06F 11/36* (2006.01)
*G06F 11/34* (2006.01)
*G06F 16/957* (2019.01)

(52) U.S. Cl.
CPC ...... *G06F 11/3688* (2013.01); *G06F 11/3438* (2013.01); *G06F 16/957* (2019.01)

(58) Field of Classification Search
CPC ............. G06F 11/3438; G06F 11/3688; G06F 16/957
USPC .................................................. 717/124–128
See application file for complete search history.

(56) References Cited

U.S. PATENT DOCUMENTS

| | | | |
|---|---|---|---|
| 8,775,598 B2 * | 7/2014 | Humphreys | G06F 16/9574 709/223 |
| 10,140,320 B2 * | 11/2018 | Trese | G06F 16/9535 |
| 10,178,190 B2 * | 1/2019 | Qiao | G06F 16/9535 |
| 11,916,727 B2 * | 2/2024 | Murthy | G06F 16/24558 |
| 2016/0042388 A1 * | 2/2016 | Chater | H04L 67/535 705/14.45 |

OTHER PUBLICATIONS

Menasalvas et al., "Subsessions: A Granular Approach to Click Path Analysis", 2004, Wiley Periodicals, Inc., pp. 619-637. (Year: 2004).*
Fei et al., "Identifying click-requests for the network-side through traffic behavior", 2021, Elsevier, 13 pages. (Year: 2021).*

* cited by examiner

*Primary Examiner* — Ted T. Vo
(74) *Attorney, Agent, or Firm* — Invoke

(57) ABSTRACT

One or more embodiments relate to a method for refining usability testing through the systematic collection and analysis of user click paths within an online interface. By tracking and filtering these click paths based on one or both of publicly observable attributes and non-publicly observable attributes, obtained in part through user responses to screening questions, the method generates distinct, aggregated click paths. These paths are then subjected to in-depth analysis that yields insights and metrics regarding user behavior and usability. Some embodiments further extend to the presentation of an interactive representation of these paths within a testing interface that allows researchers to explore and extract actionable findings.

20 Claims, 8 Drawing Sheets

FIG. 4C

USABILITY CLICK TRACKING WITH NAVIGABLE CLICK PATHS

TECHNICAL FIELD

The present disclosure relates to product design analytic and optimization systems. In particular, the present disclosure relates to providing usability click tracking with navigable click paths.

BACKGROUND

In contemporary online environments, tracking and analyzing user interactions within interfaces plays a pivotal role in understanding user behavior and enhancing usability. Existing methods predominantly focus on monitoring publicly observable attributes, such as geographical data and browser preferences. Usability testing tools commonly rely on aggregated data that provides generalized insights into user behavior.

The collection of click track data plays a pivotal role in unraveling the intricacies of user engagement within online interfaces. This process involves systematically tracing the paths users navigate through web pages by meticulously recording each click and subsequent action. Click track data encompasses a wealth of information, capturing the user's journey from one interface element to another. This granular data extends beyond the conventional metrics, offering a dynamic snapshot of user behavior within the digital environment. The precise tracking of click paths serves as a foundational element for advanced usability testing methodologies, allowing for in-depth analyses that transcend traditional approaches.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4C illustrates an additional example of a filter portion of the testing environment in accordance with one or more embodiments.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. PROCESSING ENGINE SYSTEM ARCHITECTURE
3. PROVIDING USABILITY CLICK TRACKING WITH NAVIGABLE CLICK PATHS
4. EXAMPLE COLLECTION OF USER SELF-REPORTED DATA
5. EXAMPLE TESTING INTERFACE WITH NAVIGABLE CLICK PATHS
6. HARDWARE OVERVIEW
7. MISCELLANEOUS; EXTENSIONS

1. GENERAL OVERVIEW

One or more embodiments relate to a method for refining usability testing through the systematic collection and analysis of user click paths within an online interface. By tracking and filtering these click paths based on one or both of publicly observable attributes and non-publicly observable attributes, obtained in part through user responses to screening questions, the method generates distinct, aggregated click paths. These paths are then subjected to in-depth analysis, yielding valuable insights and metrics regarding user behavior and usability. Embodiments further include the presentation of an interactive representation of these paths within a testing interface, allowing researchers to explore and extract actionable findings, thereby enhancing the efficiency and precision of usability assessments.

One or more embodiments described in this Specification and/or recited in the claims may not be included in this General Overview section.

2. PROCESSING ENGINE SYSTEM ARCHITECTURE

Figure 1:
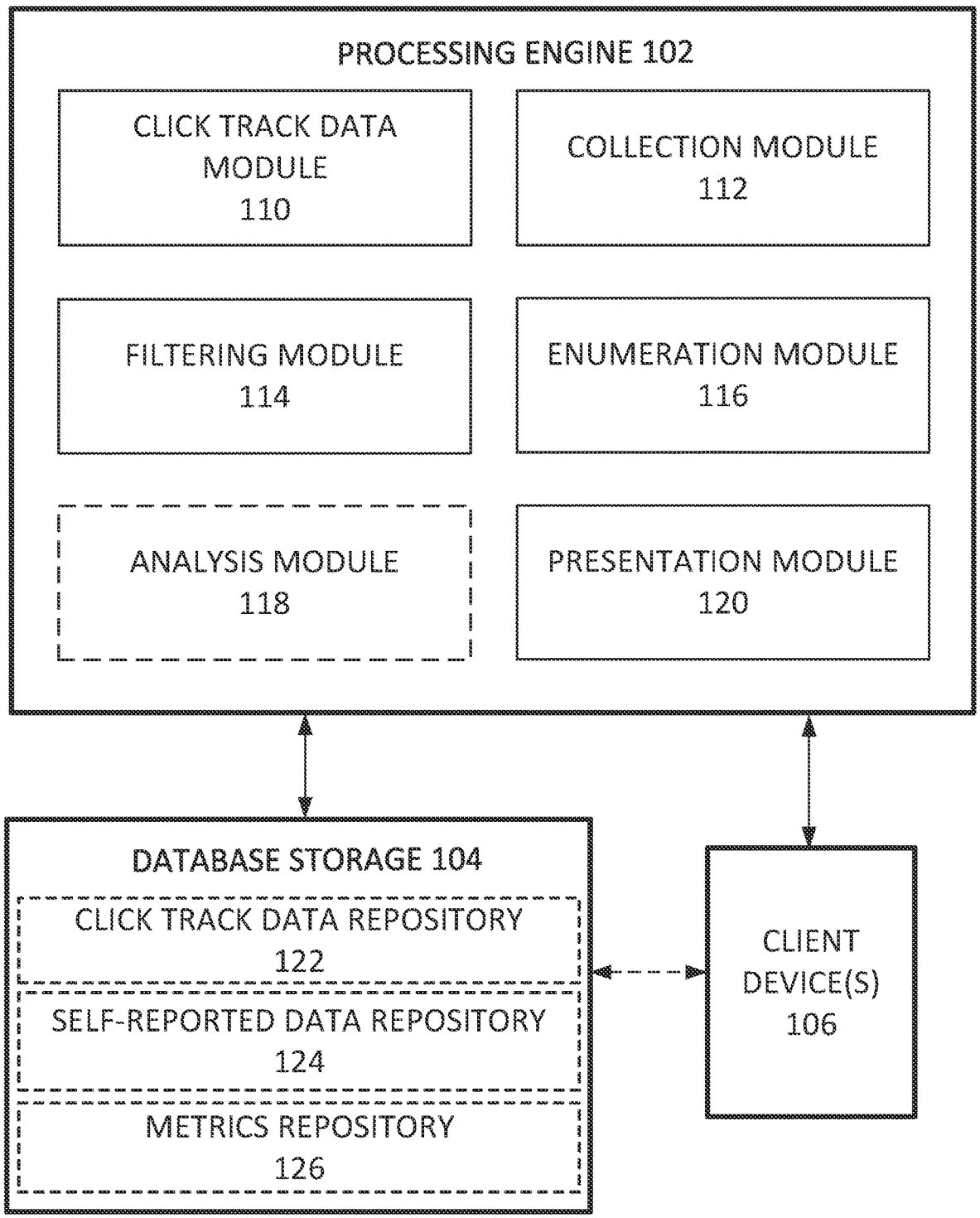
FIG. 1 illustrates a system in accordance with one or more embodiments.

FIG. 1 illustrates a system 100 in accordance with one or more embodiments. As illustrated in FIG. 1, the system 100 includes a processing engine 102, a database storage 104, and one or more client devices 106. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the processing engine 102 refers to hardware and/or software configured to perform operations described herein for providing usability click tracking with navigable click paths. Examples of operations for providing usability click tracking with navigable click paths are described below with reference to FIG. 2.

In one or more embodiments, the processing engine 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments within the processing engine 102, click track data module 110 functions to obtain click track data for users by tracking user click paths through an online interface. In one or more embodiments, the system acquires click track data for users by tracking user click paths within an online interface. This module may employ one or more algorithms and/or tracking mechanisms to seamlessly capture and record the sequences of user interactions and navigation actions with the online interface. The module attempts to compile a comprehensive dataset that encapsulates the entirety of user navigations, providing a detailed record of the specific pages, elements, and sequences traversed by each user within a set of users.

Collection module 112 functions to collect one or both of: publicly observable attributes of each user based on their interactions with the online interface, and non-publicly observable attributes of each user, including at least self-reported data from the user from one or more responses to screening questions. In one or more embodiments, the module collects publicly observable attributes of users that are derived from user interactions with the online interface. These attributes may encompass a spectrum of user behaviors and engagements, allowing for the capture of observable patterns such as, for example, frequently visited pages, time spent on specific elements, and the sequence of actions performed.

In one or more embodiments, the module collects non-publicly observable attributes of users, including at least self-reported data from users. In one or more embodiments, this collection process may involve capturing user responses to screening questions, wherein individuals provide information that may not be evident through their interactions but may provide a comprehensive understanding of, for example, user demographics, preferences, and attitudes.

Filtering module 114 functions to filter the click track data. In various embodiments, the system may filter the click track data based on one or both of the users' publicly observable and non-publicly observable attributes. In one or more embodiments, the module takes into account the publicly observable attributes, allowing for the isolation of click track data associated with specific user behaviors and engagements. This step ensures that the subsequent analysis focuses on paths shaped by observable interactions within the online interface. In one or more embodiments, the filtering module additionally or alternatively considers the non-publicly observable attributes, including attributes derived from self-reported data obtained through responses to screening questions. Filtering based on one or both of these two sets of attributes ensures that the filtered click track data encapsulates a comprehensive view of user interactions that may be utilized by the system for further processing and analysis within the testing interface.

Enumeration module 116 functions to enumerate, in an aggregated format, distinct filtered click paths of the users based on the filtered click track data. This module creates a structured representation that encapsulates the distinct click paths traced by users based on the applied filters. The module efficiently processes the refined dataset, identifying unique patterns and trajectories followed by users within the online interface. By enumerating the distinct filtered click paths in an aggregated format, this module attempts to provide an overview of user interactions. Each enumerated path encapsulates a series of user actions and engagements, offering a snapshot of the varied ways users navigate through the online interface.

In one or more embodiments, optional analysis module 118 functions to analyze the distinct filtered click paths to derive one or more insights and metrics regarding usability and user behavior. In one or more embodiments, this module employs analytical techniques to uncover, e.g., patterns, trends, and behavioral nuances to derive a comprehensive understanding of usability dynamics. In various embodiments, metrics pertaining to user engagement, navigation efficiency, and other relevant parameters are systematically derived, providing a quantitative basis for assessing the online interface's effectiveness. In one or more embodiments, the analysis module 118 operates in tandem with the enumerated click paths, ensuring that the insights drawn are rooted in the specifics of user interactions. In one or more embodiments, the derived metrics contribute not only to a quantitative evaluation of usability but also serve as a foundation for potential optimizations and enhancements to the online interface.

Presentation module 120 functions to present, within a testing interface, an interactive representation of the distinct filtered click paths for exploring different insights and metrics within the represented click paths. Within this testing interface, the presentation module showcases the aggregated click paths in a visually intuitive manner, allowing for seamless exploration. This interactive representation facilitates a dynamic and user-driven exploration of different insights and metrics embedded within the distinct filtered click paths. In one or more embodiments, researchers are presented with the ability to navigate through the represented click paths, peeling back layers of user interactions to explore the distinct click paths of different users based on user attributes.

In one or more embodiments, a database storage 104 is any type of storage unit and/or device (e.g., a file system, database, collection of tables, or any other storage mechanism) for storing data. Further, a database storage 104 may include multiple different storage units and/or devices. The multiple different storage units and/or devices may or may not be of the same type or located at the same physical site. Further, the database storage 104 may be implemented or executed on the same computing system as the processing engine 102. Alternatively, or in addition, a database storage 104 may be implemented or executed on a computing system separate from the processing engine 102. The database storage 104 may be communicatively coupled to the processing engine 102 and the client device 106 via a direct connection or via a network.

Information describing the processing engine 102 may be implemented across any of components within the system 100. However, this information is illustrated within the database storage 104 for purposes of clarity and explanation.

In one or more embodiments, the database storage 104 includes a click track data repository 122, a self-reported data repository 124, and a metrics repository 126. The click track data repository 122 serves as the repository for the click track data obtained from user interactions with the online interface. The self-reported data repository 124 functions as the repository for user-provided information gathered through responses to screening questions. This repository may also capture the non-publicly observable attributes of users. The metrics repository 126 acts as a repository for the insights and metrics derived from the analysis of distinct filtered click paths, and it stores aggregated and processed data, encapsulating information on usability and user behavior.

In one or more embodiments, the client device 106 refers to hardware and/or software configured to facilitate communications between an entity and processing engine 102. The client device 106 renders client device elements and receives input via client device elements. Examples of interfaces include a graphical client device (GUI), a command line interface (CLI), a haptic interface, and a voice command interface. Examples of client device elements include checkboxes, radio buttons, dropdown lists, list boxes, buttons, toggles, text fields, date and time selectors, command lines, sliders, pages, and forms.

In an embodiment, different components of client device 106 are specified in different languages. The behavior of client device elements is specified in a dynamic programming language, such as JavaScript. The content of client device elements is specified in a markup language, such as hypertext markup language (HTML) or XML Client device Language (XUL). The layout of client device elements is specified in a style sheet language, such as Cascading Style Sheets (CSS). Alternatively, client device 106 is specified in one or more other languages, such as Java, C, or C++.

3. PROVIDING USABILITY CLICK TRACKING WITH NAVIGABLE CLICK PATHS

Figure 2:
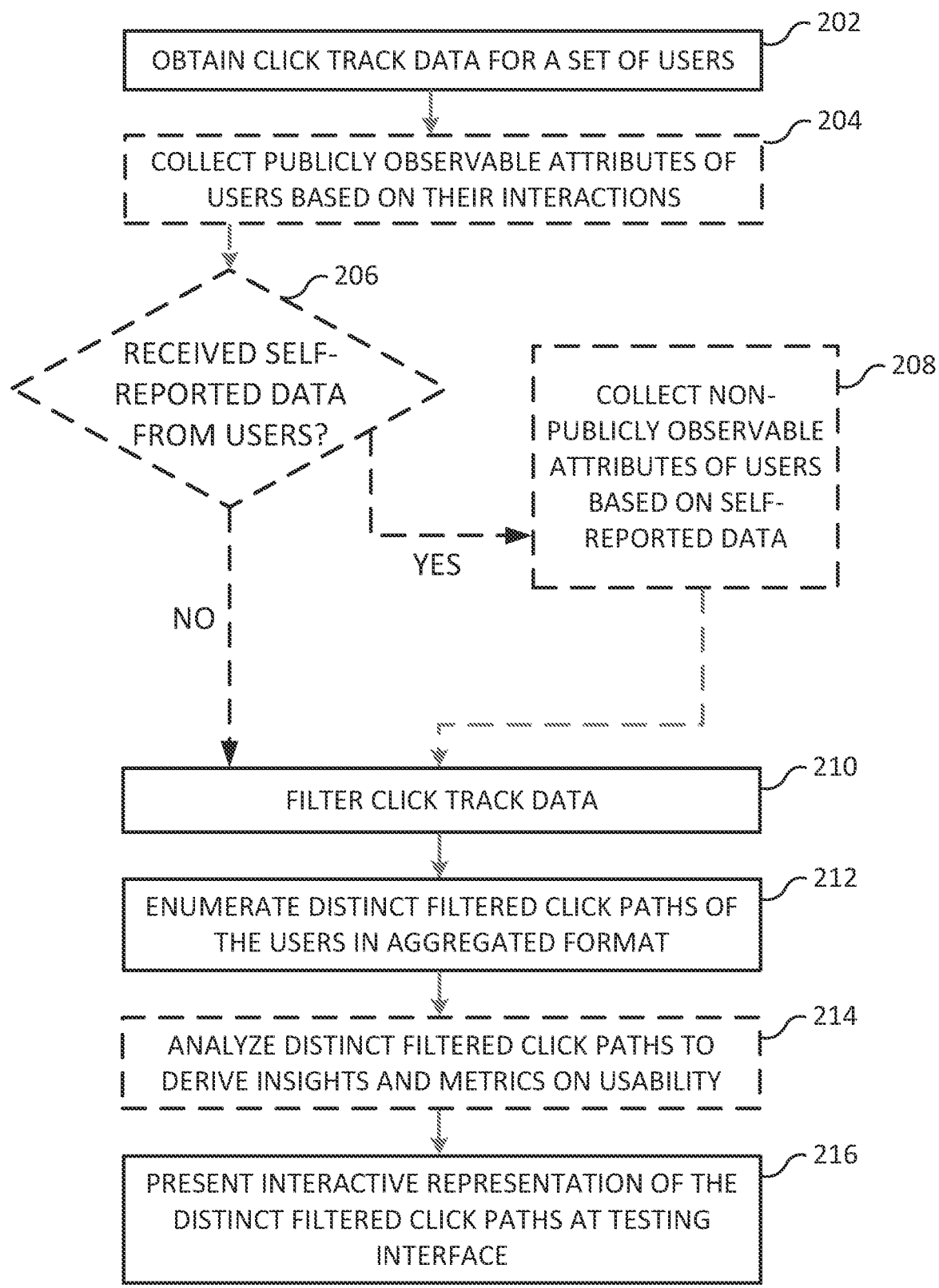
FIG. 2 illustrates an example set of operations for providing usability click tracking with navigable click paths in accordance with one or more embodiments.

FIG. 2 illustrates an example set of operations for providing usability click tracking with navigable click paths, in accordance with one or more embodiments. One or more operations illustrated in FIG. 2 may be modified, rearranged, or omitted entirely. Accordingly, the particular sequence of operations illustrated in FIG. 2 should not be construed as limiting the scope of one or more embodiments.

In an embodiment, the system obtains click track data for a set of users (Operation 202). The term "click path" as used herein refers to a sequence of interactions and navigational steps that a user undertakes while navigating through an online interface. It encompasses the specific sequence of clicks, selections, and actions performed by a user during their digital journey within a web application or platform. Each click path provides a unique trail, outlining the user's exploration of different pages, features, or functionalities within the online environment. This click path is used by usability researchers for comprehending user behavior, user preferences, optimal usability of the online environment, and the effectiveness of the interface.

"Click track data", as used herein, is the aggregate collection of information derived from monitoring and recording user click paths. This data set encapsulates the detailed record of each user's interactions within the online interface, comprising the timestamped sequence of clicks, the pages visited, and the actions taken. Click track data is a comprehensive digital footprint that offers insights into user engagement, highlighting patterns, preferences, and potential pain points.

The system acquires this click track data from a diverse cohort of users. In one or more embodiments, this is achieved by meticulously monitoring and recording the user's click paths as they navigate through an online interface. Each user interaction with the interface is systematically tracked, generating a comprehensive dataset that encapsulates the sequence of clicks and actions performed during their digital journey. This click track data serves as the foundational information, providing an intricate map of user behavior within the online environment.

In one or more embodiments, the system may collect publicly observable attributes of users based on their interactions (optional Operation 204). In one or more embodiments, the system collects publicly observable attributes of each user by capturing and aggregating information that is visibly discernible from a user's engagement within the digital environment. Publicly observable attributes pertain to aspects of user behavior, preferences, and/or characteristics that are evident and accessible without relying on private or self-reported data. In one or more embodiments, these attributes may be typically derived from the user's navigational patterns, such as, for example, the frequency of clicks, time spent on specific pages, or interactions with various interface elements.

In one or more embodiments, within the context of the online interface, publicly observable attributes may encompass the user's device type, browser preferences, or geographic location, providing insights into the technological context and regional dynamics shaping their digital experience. Additionally, the operation involves monitoring how users interact with different elements on the interface, such as buttons, links, or forms to discern preferences and usage patterns.

In one or more embodiments, the system periodically monitors to determine whether self-reported data from users has been received (optional Operation 206). The system actively engages in periodic monitoring to ascertain the reception of self-reported data from users. In one or more embodiments, this periodic monitoring involves a systematic and recurrent evaluation of the data acquisition process. The system, at defined intervals, checks for the submission of self-reported information from users. In one or more embodiments, during these periodic checks and determination of whether self-reported data has been received, the system assesses the availability and completeness of self-reported data within one or more repositories or databases.

In one or more embodiments, self-reported data encompasses information voluntarily provided by users about themselves. In the context of the described system, one prominent example is the user's responses to screening questions. These questions may serve as a deliberate and structured means to elicit specific details from users. For instance, a screening question might inquire whether the user is a member of a loyalty program related to the product or service being tested. The user's affirmative or negative response to such a query constitutes self-reported data and can be used by usability researchers in categorizing users based on relevant attributes.

Additionally, in various embodiments, users may be prompted to disclose demographic information such as gender, income bracket, or professional affiliation. For example, a user might be asked to specify their role within a company or indicate their income range. In essence, self-reported data is a collection of user-provided information often gathered through explicit inquiries or prompts. It can include a spectrum of details, ranging from, e.g., preferences and affiliations to specific experiences and opinions, each of which contributes to a more comprehensive profile of the user within the system's dataset.

In one or more embodiments, if the system determines that it has received self-reported data from users, then the system proceeds to collect non-publicly observable attributes of users based on the self-reported data (optional Operation 208). If the system determines that it has not received any self-reported data from users, then in one or more embodiments, the system may proceed to filter click track data (Operation 210). In one or more alternative embodiments, it may instead continue to monitor for whether it has received self-reported data from any users until self-reported data is received. Upon receiving this self-reported data, the system may then proceed to collect non-publicly observable attributes of users (optional Operation 208).

In one or more embodiments, the system collects publicly observable attributes or users and also collects non-publicly observable attributes of users. In one or more embodiments, the system collects publicly observable attributes of users, but not non-publicly observable attributes of users. In one or more embodiments, the system collects non-publicly observable attributes of users, but not publicly observable attributes of users.

In one or more embodiments, upon the system determining in Operation 206 that it has received self-reported data, the system proceeds to collect non-publicly observable attributes of users based on the self-reported data (optional Operation 208). These non-publicly observable attributes of each user include at least the self-reported data that was received by the system in Operation 206. In one or more embodiments, this self-reported data is processed and analyzed by the system to determine one or more attributes of the user. For example, these attributes may encompass demographic details such as age, gender, or occupation, as well as more subjective information such as personal preferences, attitudes, or specific areas of interest. In one or more embodiments, the system employs sophisticated algorithms to parse and interpret the self-reported data, extracting meaningful patterns and associations that contribute to a nuanced understanding of the user. In one or more embodiments, by processing and analyzing this information, the system can categorize users into relevant segments, identify commonalities or trends among them, and derive valuable insights that extend beyond observable behaviors.

For example, if users were asked about their preferred product features or design aesthetics in the screening questions, the system can analyze these responses to identify clusters of users with similar preferences. This analysis could reveal insights into distinct user groups, allowing for targeted adjustments or enhancements to the online interface that align more closely with users' preferences.

In one or more embodiments, the operation of collecting non-publicly observable attributes of each user involves gathering information beyond what is externally evident, focusing on details that users may not explicitly showcase during their interactions with the online interface. A component of this process may include the acquisition of self-reported data, primarily derived from the users' responses to screening questions. These questions are deliberately designed to extract specific insights into users' characteristics, preferences, and affiliations that may not be readily apparent through their online interactions. The self-reported data obtained through screening questions contributes to a more nuanced understanding of users, allowing for the collection of attributes that go beyond publicly observable actions. For example, users might provide information about their preferences, experiences, or specific criteria that influence their decision-making processes.

In an embodiment, the system filters the click track data for users (Operation 210). In various embodiments, the system filters the click track data based on one or both of the users' publicly observable and non-publicly observable attributes. The system may perform this filtering based on explicit interactions with the online interface (i.e., publicly observable attributes), more nuanced, self-reported data collected from screening questions or other non-public interactions (i.e., non-publicly observable attributes), or both.

For example, if the system has collected publicly observable attributes like the geographic location, device type, or browsing history of users, and has paired these attributes with non-publicly observable attributes such as self-reported preferences and demographic details, the filtering process can tailor a usability analysis to specific user segments. The filtering operation enables the system to focus on subsets of the user population that share common characteristics, ensuring that subsequent insights and metrics generated in later operations are contextually relevant and insightful.

In one or more embodiments, the filtering process is not only restricted to demographic attributes, but it may also extend to dynamic factors. Such dynamic factors may include, for example, the time of interaction, frequency of visits, or specific features engaged with during the online session.

In an embodiment, the system enumerates the distinct filtered click paths of the users in aggregated format (Operation 212). This operation involves the system organizing the refined click track data into a structured representation, highlighting the specific navigation sequences taken by users based on the filtered attributes. The aggregation ensures a comprehensive overview, capturing commonalities and deviations within user interactions.

Consider an example where users with similar demographics and preferences have been identified through the filtering step. Through an enumeration process, the system compiles their click paths, presenting a collective view of how this specific user segment navigates through the online interface. This aggregated format facilitates a macroscopic understanding, revealing patterns and trends that might be obscured when examining individual paths in isolation.

The term "distinct filtered click paths" emphasizes the uniqueness of these aggregated sequences. Each enumerated path encapsulates the collective journey of a subset of users with shared characteristics. By adopting an aggregated format, the system streamlines the subsequent analysis, providing usability researchers and applications with a consolidated yet detailed perspective on user behavior. This approach ensures that common trends and outliers alike are visible, setting the stage for deriving meaningful insights in later operations.

In one or more embodiments, the system dynamically adjusts the granularity of the aggregated format for distinct filtered click paths based on the complexity of user interactions and behaviors. This can account for user interactions and behaviors varying significantly in complexity across different interfaces or scenarios. To address this variability, the system adapts the level of detail in the representation of click paths based on the intricacy of user interactions, ensuring that the visualized data remains informative and user-friendly.

In one or more embodiments, the dynamic adjustment of granularity enhances the scalability and flexibility of the method. For interfaces characterized by straightforward user interactions, the system may present a more concise and high-level representation of click paths to avoid overwhelming researchers with unnecessary details. Conversely, for interfaces involving intricate user journeys or intricate behavior patterns, the granularity can be increased to provide a more nuanced and detailed view.

In one or more embodiments, the system may analyze the distinct filtered click paths to derive insights and metrics on usability (optional Operation 214). In one or more embodiments, this phase involves a detailed examination of the aggregated click paths to extract information that aids in understanding how users interact with the online interface.

The term "distinct filtered click paths" implies that the analysis focuses on the organized sequences of user interactions, each representing a specific subset identified through the filtering process. During analysis, various metrics related to usability and user behavior are computed. In one or more embodiments, these metrics may encompass factors such as the average time users spend on specific pages, common navigation patterns, and the success rates of completing tasks or achieving goals within the interface.

In one or more embodiments, insights derived from the analysis can serve to provide a deeper understanding of the user experience. For example, researchers or downstream applications may uncover particular pain points or areas where users tend to abandon their journey. Metrics related to the efficiency and effectiveness of the interface become apparent, offering valuable benchmarks for usability evaluation. The analysis may also reveal correlations between user attributes and specific interaction patterns, contributing to a nuanced comprehension of user behavior.

In one or more embodiments, the insights obtained from this analysis phase are not merely descriptive but can serve as actionable intelligence. Researchers and/or digital design applications, such as website development tools and environments, can use these insights to make informed decisions about optimizing the online interface, addressing usability issues, and enhancing overall user satisfaction. The method's strength lies in its ability to distill complex user interactions into quantifiable metrics and actionable insights, providing a solid foundation for data-driven improvements to the online interface.

In one or more embodiments, the system may incorporate machine learning algorithms to facilitate the analysis of the distinct filtered paths. A machine learning algorithm is an algorithm that can be iterated to train a target model f that best maps a set of input variables to an output variable using a set of training data. The training data includes datasets and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

A machine learning algorithm $114x$ generates a target model f such that the target model f best fits the datasets of training data to the labels of the training data. Additionally, or alternatively, a machine learning algorithm $114x$ generates a target model f such that when the target model f is applied to the datasets of the training data, a maximum number of results determined by the target model f matches the labels of the training data. Different target models can be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, the system incorporates machine learning algorithms to identify correlations between certain click paths and user attributes as well as to provide automated insights. Machine learning algorithms enable the system to discern intricate patterns and correlations within the collected data that may not be immediately apparent through traditional analysis methods. By identifying associations between user attributes and click paths, the method can provide automated insights into user behavior and usability trends. This not only streamlines the analysis process, but it also facilitates a more nuanced understanding of the factors influencing user interactions. Moreover, the use of machine learning algorithms enhances the system's adaptability over time. As it processes more data and refines its understanding of user behavior, the algorithms can evolve to provide increasingly accurate and relevant insights. This adaptability ensures that the method remains effective in uncovering nuanced correlations and trends in user interactions, contributing to the continuous improvement of usability testing outcomes.

In one or more embodiments, the system applies statistical analysis techniques to validate the significance of observed patterns and insights within the distinct filtered click paths. Within the testing interface, the system applies statistical analysis to assess the reliability and significance of the identified patterns and insights. This involves employing established statistical methods to determine whether the observed trends are statistically significant, helping researchers differentiate between meaningful insights and random occurrences. In one or more embodiments, the statistical analysis techniques may entail one or more of the following: correlation analysis, regression analysis, hypothesis testing, analysis of variance, a chi-square test for independence, or any other suitable statistical analysis techniques.

In one or more embodiments, the system utilizes natural language processing (NLP) algorithms to extract actionable recommendations from the analysis of distinct filtered click paths. In one or more embodiments, the NLP algorithms operate on the aggregated and filtered click paths, identifying significant patterns, correlations, and behavioral insights. These algorithms are designed to go beyond surface-level observations, delving into the contextual nuances of user interactions within the online interface. The NLP algorithms contextualize the extracted insights taking into account various factors, including specific user attributes, the sequence of interactions, and the characteristics of interface elements.

In an embodiment, the system presents an interactive representation of the distinct filtered click paths at a testing interface (Operation 216). In one or more embodiments, the system dynamically generates an interactive representation that allows one or more usability researchers to explore various insights and metrics within the represented click paths. The testing interface may serve as a dynamic platform for visualizing and comprehending the nuanced details of user interactions.

The interactive representation is designed to provide a user-friendly environment where researchers can navigate through the identified click paths and delve into specific aspects of user behavior. In one or more embodiments, this may include a visual timeline of user interactions which highlights common navigation routes and visually emphasizes points of interest or friction within the interface. The goal is to present the data in a format that facilitates a comprehensive representation of how users engage with the online platform.

In one or more embodiments, within the testing interface, usability researchers can interact with the presented click paths, exploring different dimensions of usability and behavior metrics. The representation may offer options to filter data further, focusing on, e.g., specific user attributes, behaviors, or success metrics. In one or more embodiments, researchers can dynamically switch between views to gain a perspective on the user experience and extract actionable insights. The interactive nature of the representation fosters an iterative and exploratory approach to data interpretation, enabling researchers to test hypotheses, validate assumptions, and refine their understanding of user behavior in real-time to determine optimal usability for a particular online interface or environment.

In one or more embodiments, the system presents, within the testing interface, a path explorer configured to display the distinct filtered click paths based on different user attributes and behaviors without displaying every different click path at once. This specialized tool is configured to operate within the testing interface, serving as a means for displaying the identified click paths based on a researcher opting to explore click paths based on different user attributes and behaviors. The path explorer's purpose is to provide a focused view, allowing researchers to analyze specific subsets of click paths without overwhelming the interface with all the variations simultaneously. In one or more embodiments, researchers can selectively explore paths based on different user attributes and behaviors, gaining targeted insights into how specific groups of users interact with the online interface. This focused exploration avoids information overload, enabling a more accessible understanding of user behavior and preferences at a more granular level.

In one or more embodiments, the path explorer's configuration ensures that researchers have granular control over the visualization of distinct filtered click paths. Instead of presenting all paths at once, impractical for comprehensive analysis, the path explorer allows researchers to toggle between different views based on chosen user attributes and behaviors. This tailored presentation enhances the researchers' ability to identify patterns, anomalies, and trends within specific user segments, contributing to a more thorough and detailed usability assessment.

In one or more embodiments, the system updates the progress of the path exploration and adapts visualizations based on one or more steps selected by researchers. This functionality involves continuously or periodically updating the progress of the ongoing path exploration based on specific steps chosen by researchers. As researchers interact with the interface, selecting different steps or criteria for exploration, the system adapts in real-time, ensuring that the visualizations align with the evolving focus of the analysis. The updating of progress encompasses tracking the sequential steps researchers take during exploration. Each step corresponds to a deliberate choice or adjustment made by researchers, such as refining the user attributes or modifying behavioral criteria. In one or more embodiments, the system further adapts visualizations based on the selected steps. This adaptation ensures that the visual representation of distinct filtered click paths aligns with the researchers' specific inquiries and areas of interest. For example, in one or more embodiments, if researchers choose to focus on a particular demographic attribute or behavioral pattern, the visualizations are tailored to emphasize relevant details, providing a more targeted and meaningful representation of the data.

In one or more embodiments, the system displays, within the testing interface, one or more recommended actions based on the analysis of the distinct filtered click paths. Following the analysis of distinct filtered click paths, the system generates one or more actionable insights. These insights are translated into concrete recommendations aimed at improving usability or addressing specific user behavior patterns. This addition enhances the practical utility of the method by providing not only analytical results but also actionable guidance for potential improvements or optimizations. In one or more embodiments, the displayed recommended actions are derived directly from the insights gleaned through the analysis of distinct filtered click paths. For example, if the analysis reveals certain bottlenecks in user interactions or highlights suboptimal pathways, corresponding recommendations may include interface adjustments, content optimization, or other modifications to enhance user experience. One or more of these actions may be automatically executed by the system, such as being executed in response to receiving one or more commands from a user, such as the researcher or a product developer.

In one or more embodiments, the system provides an option within the testing interface to focus on specific segments of the distinct filtered click paths for in-depth analysis. For example, users operating within the testing interface can selectively target and investigate specific portions of the aggregated click paths. The segmentation could be based on various criteria, such as user attributes, behaviors, or interactions with specific interface elements.

In one or more embodiments, the system customizes the testing interface to allow a researcher to define and apply their own criteria for filtering and displaying distinct click paths. For example, researchers may have the capability within the testing interface to set personalized parameters based on their unique research goals or the specific aspects of user interactions they find most relevant. The customization may involve defining criteria related to, for example, user attributes, behaviors, or other characteristics researchers may deem relevant.

In one or more embodiments, the system automatically generates visualizations that highlight patterns and trends within the distinct filtered click paths for efficient analysis. The visualizations generated automatically may include, for example, graphical representations of user interactions, paths taken, and other relevant metrics that provide a comprehensive overview of usability and behavior trends.

In one or more embodiments, the system enables real-time collaboration between multiple researchers within the testing interface for concurrent exploration and analysis of distinct filtered click paths. This real-time collaboration feature enables researchers to work concurrently within the testing interface, creating an environment where insights can be shared, discussed, and collectively analyzed among multiple researchers.

In one or more embodiments, the system provides a search functionality within the testing interface to locate specific user interactions or patterns within the distinct filtered click paths. The search functionality provides researchers with the ability to input, for example, specific criteria, keywords, or patterns they are interested in within the testing interface. The system then conducts a search within the distinct filtered click paths, presenting relevant results that match the specified criteria. By incorporating a search feature, the system can provide solutions for navigating a large amount of data within the distinct filtered click paths, enabling researchers to pinpoint and focus on areas of particular interest.

In one or more embodiments, the system is configured to provide a replay feature within the testing interface, allowing researchers to review specific user sessions corresponding to distinct filtered click paths. In one or more embodiments, the replay feature enables researchers to select a specific user session from the distinct filtered click paths and replay the entire interaction sequence within the testing interface. For example. researchers can use this feature to closely examine specific instances, identify pain points, and gain insights into user decision-making processes. This capability is particularly valuable for usability testing, providing researchers with a tool to delve into the intricacies of user interactions.

In one or more embodiments, the system integrates user feedback mechanisms within the testing interface to gather qualitative insights complementing the quantitative analysis of distinct filtered click paths. This integration allows for the collection of qualitative insights, complementing the quantitative analysis derived from click track data. The user feedback mechanisms are strategically positioned to capture users' subjective experiences, preferences, and/or opinions as they navigate the online interface. Researchers can thus correlate quantitative metrics from click paths with qualitative feedback, gaining insights into not only what users do but also why they make specific choices. Within the testing interface, users may be prompted to provide feedback at key interaction points or upon task completion. This real-time feedback mechanism ensures that insights are not solely retrospective but also capture immediate user sentiments. In one or more embodiments, the system aggregates and correlates this qualitative feedback with the corresponding click paths, presenting a unified view for researchers.

In one or more embodiments, the system generates one or more automated reports that summarize key insights and metrics derived from the analysis of distinct filtered click paths for usability assessments. The automated reporting system operates within the testing interface, generating comprehensive reports summarizing essential insights and metrics obtained from the analysis of distinct filtered click paths. These reports offer a concise overview of usability-related information, allowing researchers to quickly grasp key findings without delving into extensive datasets.

In one or more embodiments, after insights and metrics have been derived, the system may implement a generative artificial intelligence ("AI") system to generatively create a set of distinct interface elements for the online interface. The system may then track and analyze user interactions with the different interface elements to derive insights and metrics related to optimal user paths through the online interface. The system may utilize this generative AI system to create a diverse set of distinct interface elements for the online interface. These elements may include various design components, features, or interactive elements that contribute to a dynamic and varied user experience.

In one or more embodiments, following the generative creation of interface elements, the method involves tracking and analyzing user interactions with these diverse elements. This expands the scope of the analysis beyond user-defined paths, now encompassing insights and metrics related to optimal user paths through the online interface. The generative AI system introduces an innovative dimension that enables the system to explore how users interact with dynamically generated interface elements, optimizing the user experience based on these interactions. The system, therefore, can leverage generative AI to not only create diverse interface elements but also to assess and refine them based on real user interactions. The system can derive insights into which interface elements are more conducive to optimal user paths, providing valuable information for interface design optimization.

In one or more embodiments, the generative AI system adapts its generation of interface elements based on real-time feedback from user click paths, continuously optimizing for improved usability. The generative AI system, by incorporating real-time feedback from user click paths, aligns the process of generating interface elements with the ongoing user experience. As users engage with the interface elements, their interactions serve as input for the generative AI system to refine and optimize subsequent iterations of generated elements. This iterative approach enhances the system's ability to align with users' evolving expectations and preferences.

4. EXAMPLE COLLECTION OF USER SELF-REPORTED DATA

Figure 3:
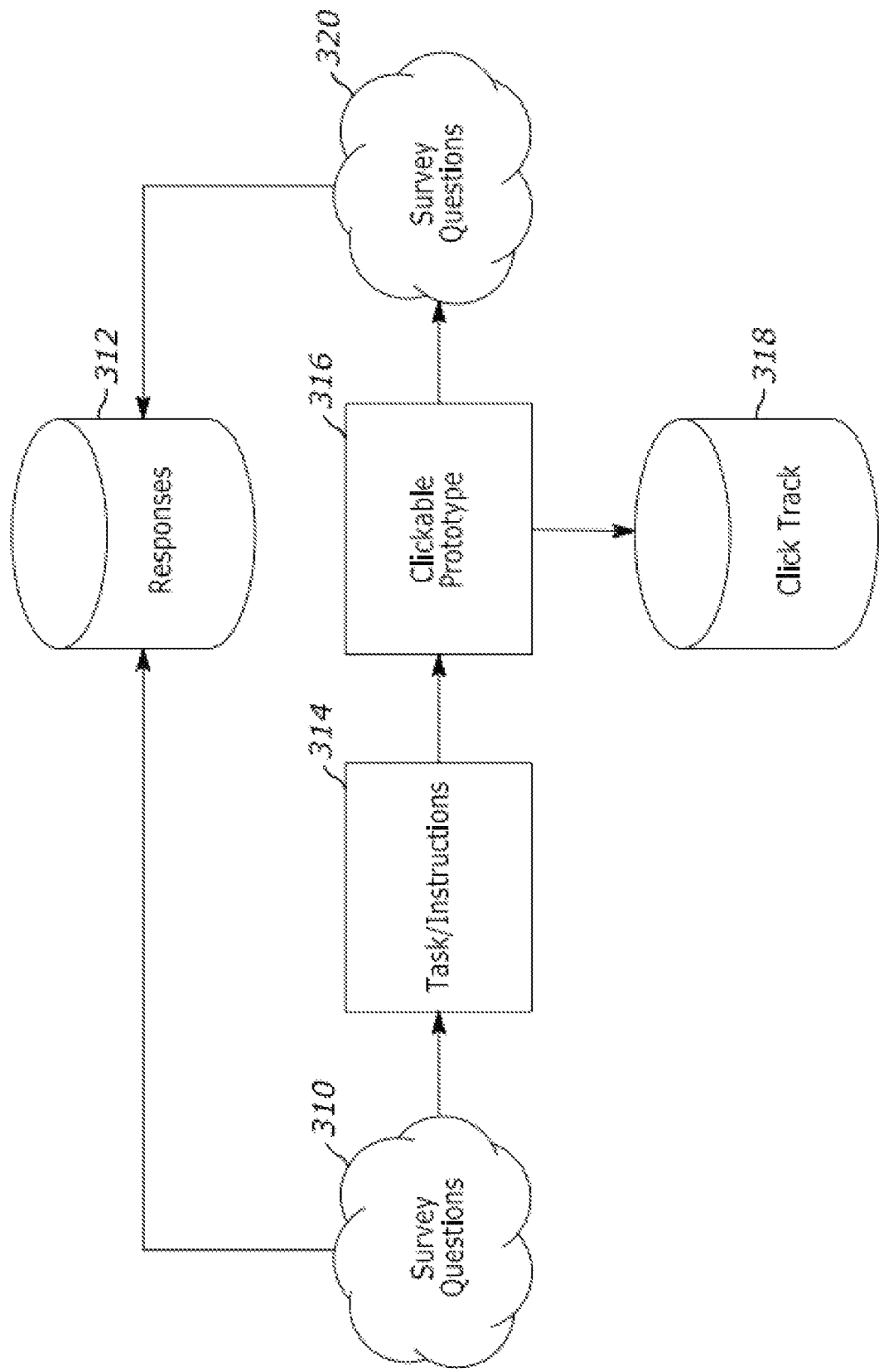
FIG. 3 illustrates one example of a process by which individual user self-reported data is collected in accordance with one or more embodiments.

FIG. 3 illustrates one example of a process by which individual user self-reported data is collected in accordance with one or more embodiments.

First, a respondent will be presented with one or more survey questions (Operation 310). The survey questions are presented to the respondent to determine the respondent's relevance to the study at hand, understand the respondent's initial state, or otherwise glean screening data from the respondent. The survey questions are answerable by the respondent. The responses of the respondent are submitted to the system (Operation 312).

Next, the respondent is presented with a researcher-created task and/or a set of instructions (Operation 314). A clickable prototype is then presented to the respondent (Operation 316). The respondent uses and navigates through the clickable prototype to complete the task or set of instructions. The clicks are collected and retained during this activity (Operation 318). The respondent is asked one or more additional survey questions to further determine their relevance to the study and-or understand their experience (Operation 320). Responses to the post-activity questions are collected and retained for the respondent, then submitted to the system (Operation 312). The details of the arrangement for this process may vary from system to system. In this example, a survey is presented to a respondent with a clickable prototype sandwiched between questions. A qualified respondent's path through the survey results in a collection of responses and a click track.

The above process is executed until a study has collected the target number of respondents. Every respondent response and click track is collected and presented within a testing interface to be presented to one or more usability researchers. This testing interface will be described in further detail with respect to FIG. 4A.

5. EXAMPLE TESTING INTERFACE WITH NAVIGABLE CLICK PATHS

Figure 4A:
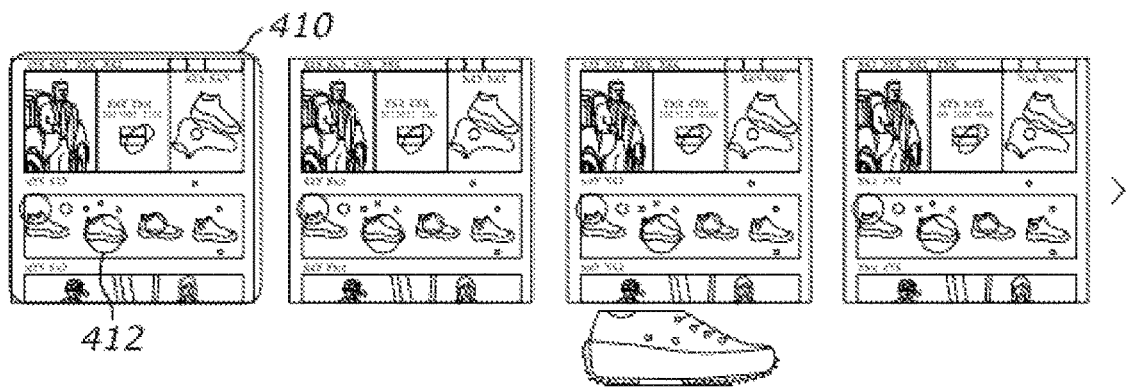
FIG. 4A illustrates an example of a testing environment presented to one or more usability researchers in accordance with one or more embodiments.
Figure 4A:
Figure 4A:
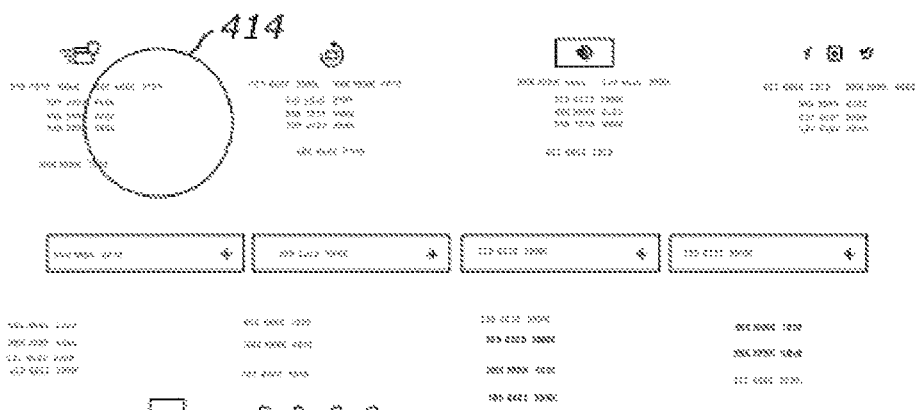

FIG. 4A illustrates an example of a testing interface presented to one or more usability researchers in accordance with one or more embodiments. All respondent responses and click tracks from FIG. 3 are collected and presented within this testing interface that can be used and navigated by usability researchers. Within this portion of the testing interface, the system displays individual pages of the online environment that is the subject of the testing and users' clicks within those pages. Page 410 is one page within a browsable list of pages within the online environment. An overlay of clicks is presented within each page within this browsable list, indicating where users have interacted within this page. Cluster of clicks 412 is shown within page 410 to indicate that within an aggregated set of users, a larger proportion clicked on this interface element compared to other interface elements. Below the browsable list of pages, a view of a page of interest is presented with a cluster of clicks 414 shown within that page of interest.

Figure 4B:
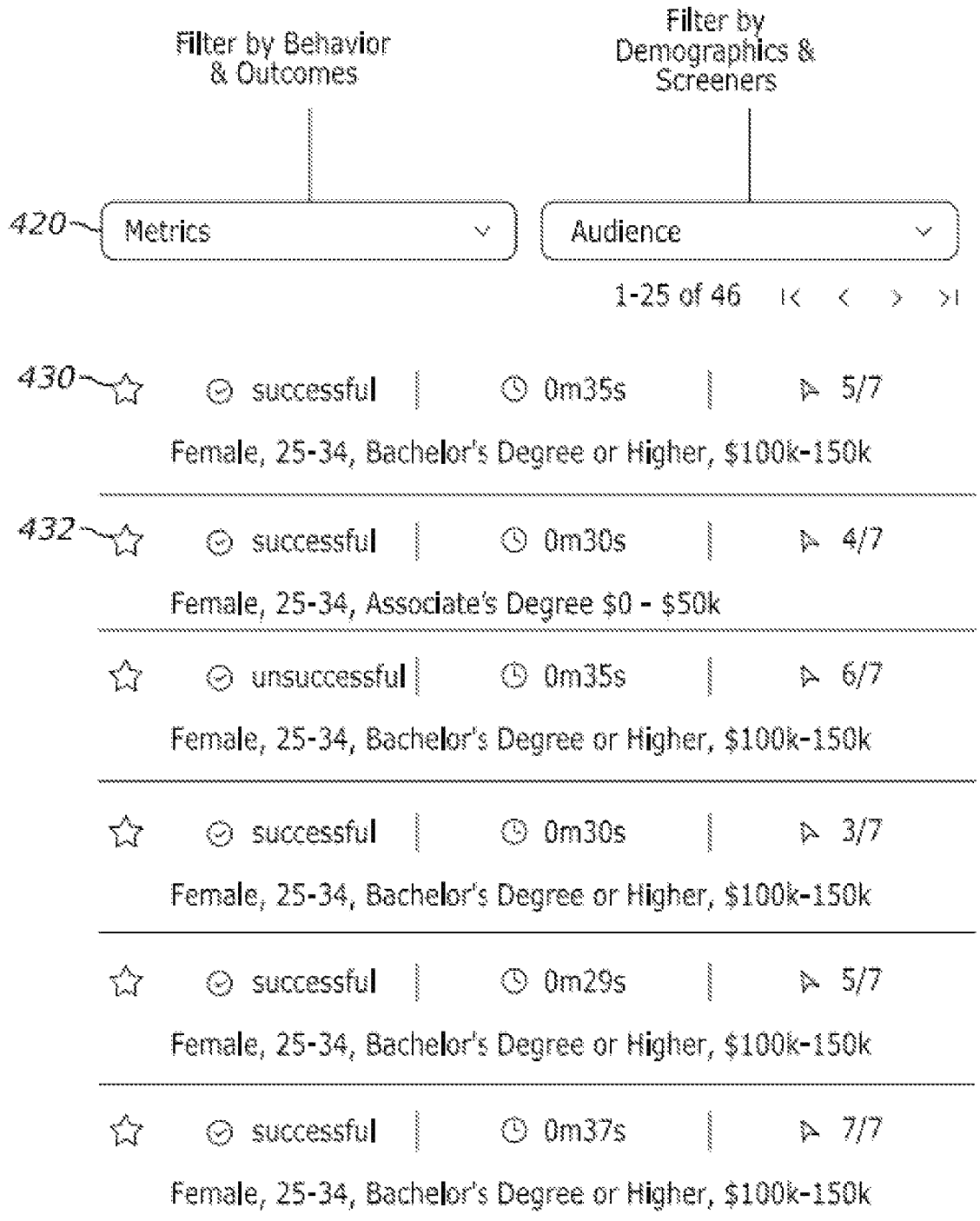
FIG. 4B illustrates an example of a filter portion of the testing environment in accordance with one or more embodiments.

FIG. 4B illustrates an example of a filter portion of the testing environment in accordance with one or more embodiments. In one or more embodiments, this filter portion is displayed alongside the portion of the testing environment shown in FIG. 4A. In this portion, a researcher using the testing environment can quickly filter user clicks and click paths by metrics 420, including behavior and outcomes, as well as audience, including demographics and responses to screening questions. In this fashion, the researcher can test usability hypotheses based on certain selections of attributes, including one or both of publicly observable attributes and non-publicly observable attributes, as well as insights and metrics generated by the system. Below the filtering portion, distinct filtered click tracks are presented based on the filter criteria. In click path 430, the researcher can view the click tracks of all audience members with attributes of female, ages 25-34, with a bachelor's degree or higher, and with an income range of $100-$150 k, who have had a successful outcome for the task, have taken 35 seconds to complete the task, and have rated case of the task at 5 out of 7. In click path 432, the researcher can view the click path of all audience members with attributes of female, ages 25-34, with an associate degree, and with an income range of $0-$50 k, who have had a successful outcome for the task, have taken 30 seconds to complete the task, and have rated case of the task at 4 out of 7. Thus, the researcher can easily select click tracks for different outcomes, efforts, and perceptions.

Figure 4C:
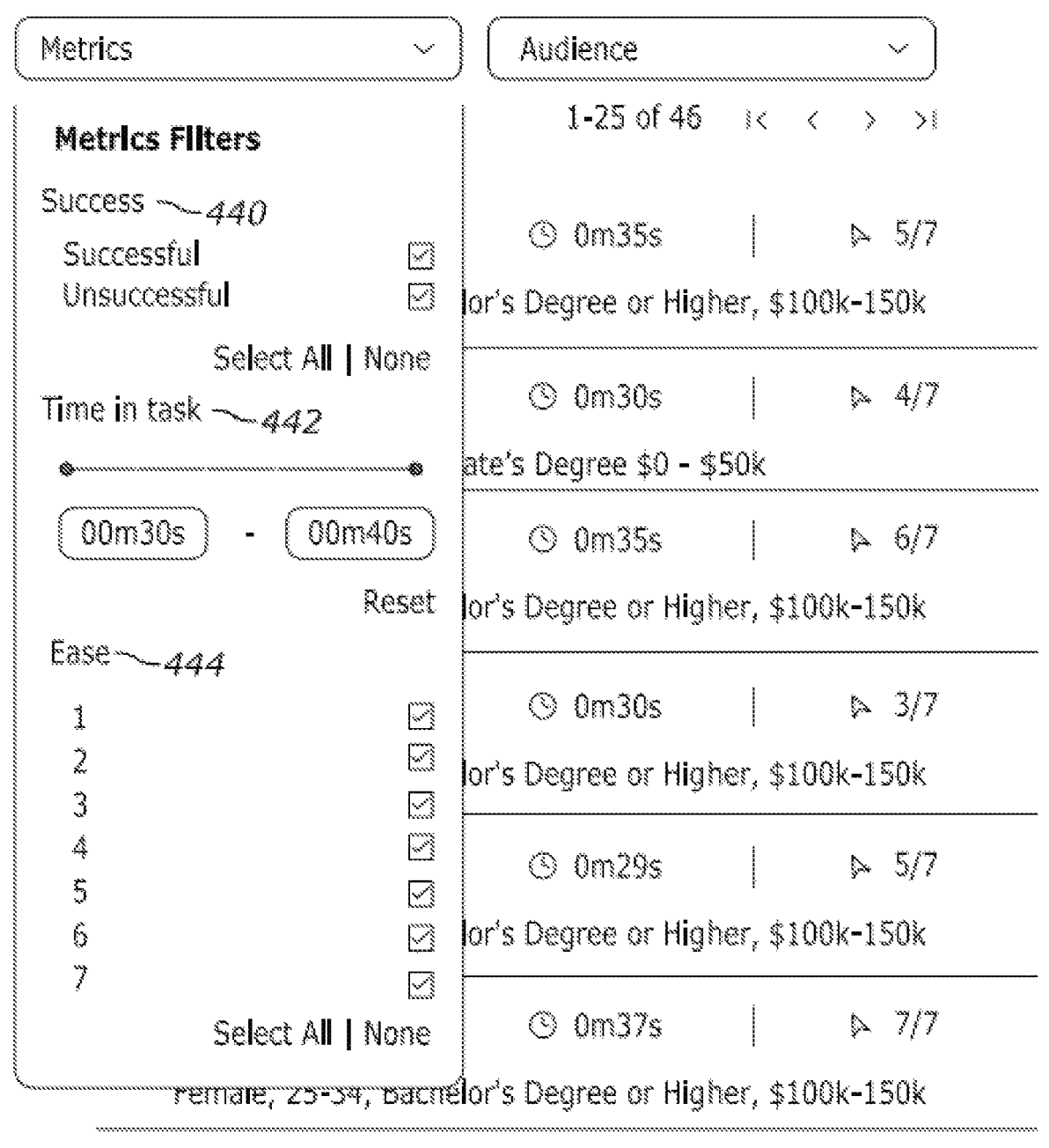

FIG. 4C illustrates an additional example of a filter portion of the testing environment in accordance with one or more embodiments. In this example, the researcher from FIG. 4B has clicked on the filtered drop-down menu for metrics. The researcher may now select various metrics criteria to filter the click tracks presented. In the "success" section 440, the researcher may select Successful, Unsuccessful, or both to be presented. In the "time on task" section 442, the researcher may select a range of times that the audience members spent on the task presented to them within a clickable prototype. In the "ease" section 444, the researcher may select the scoring of "ease" of the task the users self-reported in their survey responses. By selecting these criteria, the researcher may filter down to specific metrics and view click paths and clusters of clicks on pages based on the criteria.

Figure 4D:
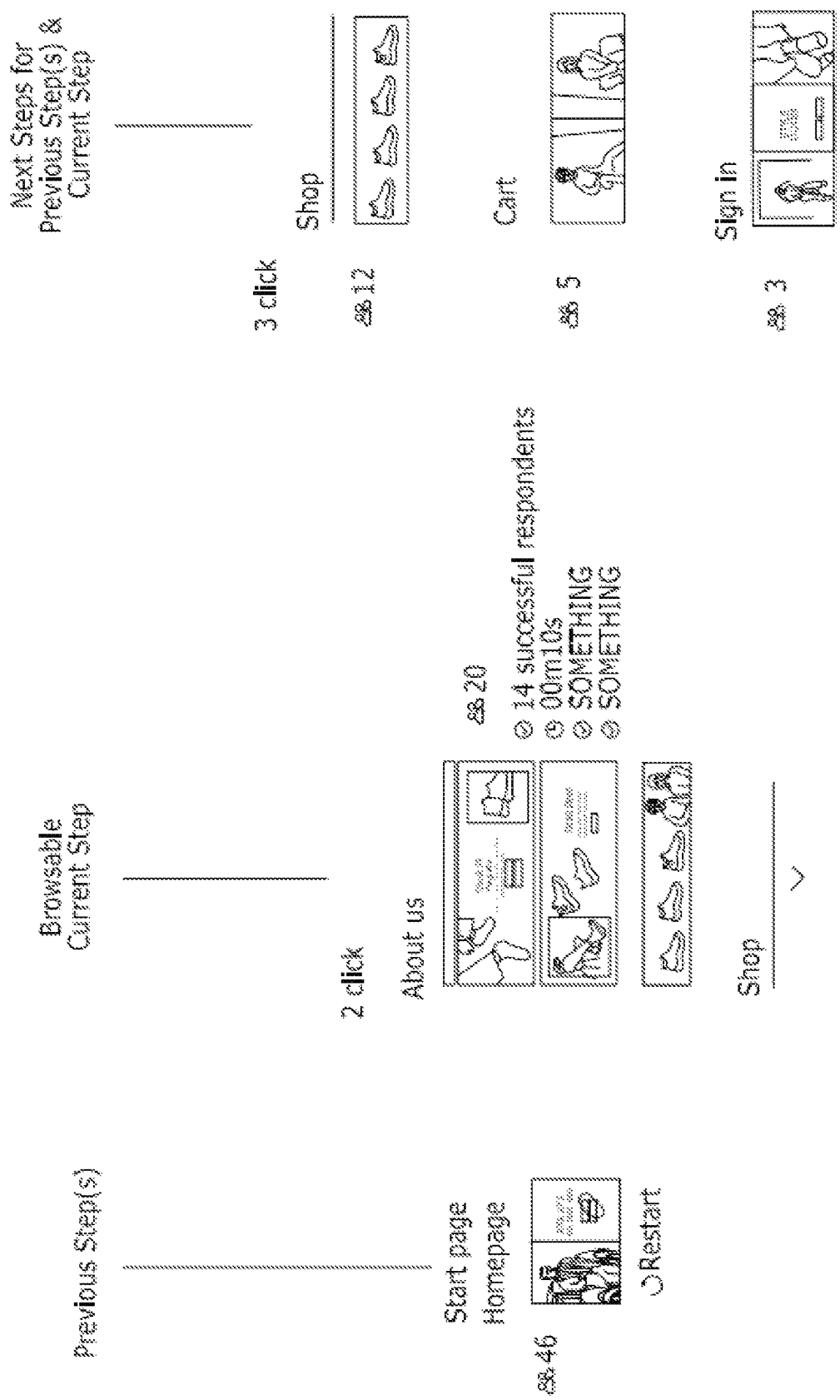
FIG. 4D illustrates a path exploration tool presented within a testing interface in accordance with some embodiments.

FIG. 4D illustrates a path exploration tool presented within a testing interface in accordance with some embodiments. The visualization presented in this path exploration tool can be seen to allow a researcher to understand click paths within a specific middle ground of complexity presented to them. This visualization is focused on assisting the researcher to understand very distinct paths. In the example, the visualization does not include statistics to understand weight. As the researcher selects steps in the sequence, they move to the left into fixed states. As the researcher browses the current step in the path they are investigating, the available next steps will dynamically populate based on the instances available. Thus, the step shown in the middle is the browsable current step the researcher has navigated to within this click path. The step shown on the left is the previous step the researcher has navigated from; this is also where the users have navigated from in this particular click path. The step shown on the right is the next step for the previous step(s) and the current step that are both dynamically populated in real-time for the researcher. This visualization shown can be filtered by selected criteria, similarly to the click paths presented in FIG. 4C.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
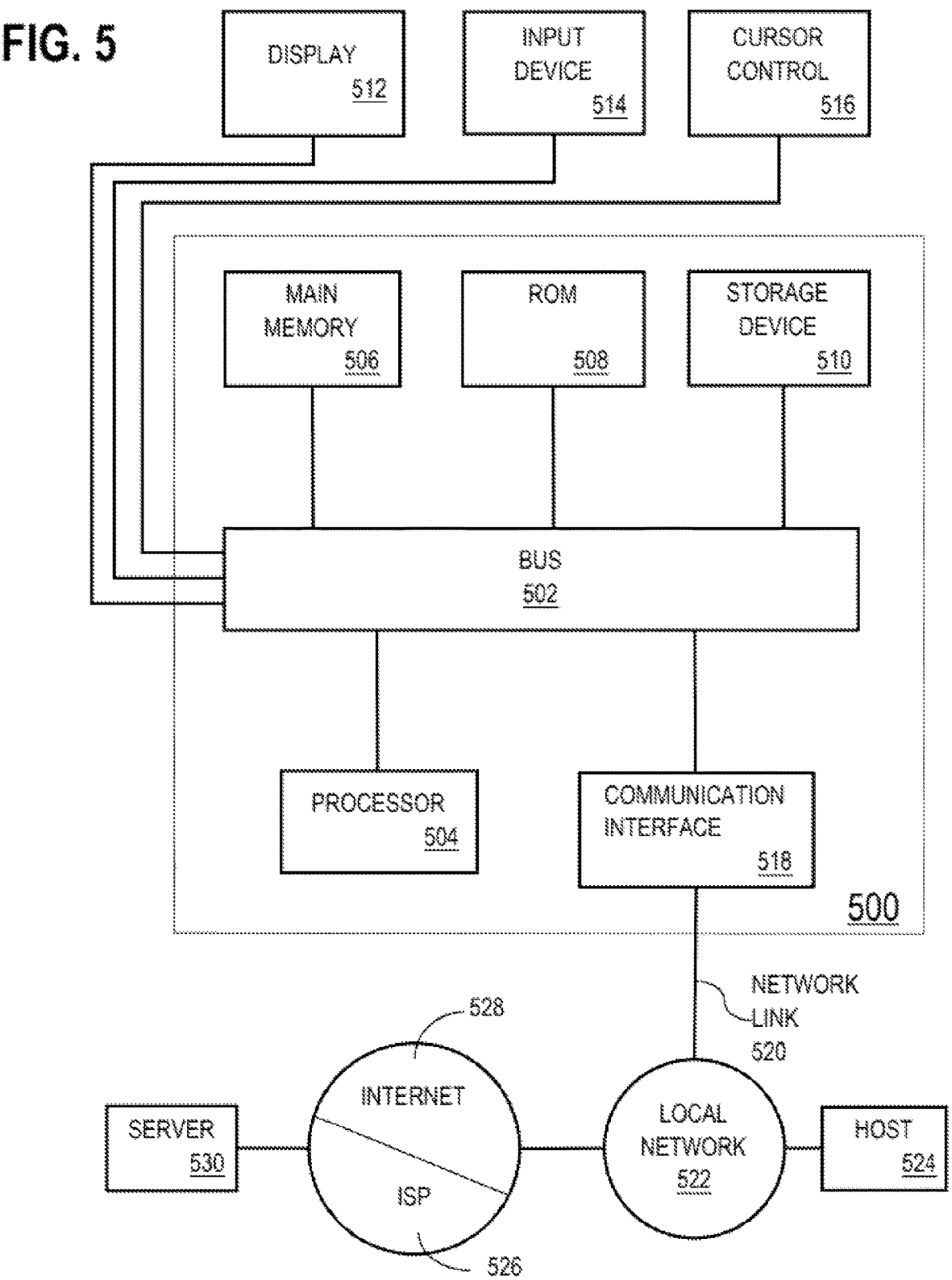
FIG. 5 shows a block diagram that illustrates a computer system in accordance with one or more embodiments.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer entity. An input device 514, including alphanumeric and other keys, is coupled to bus 502 for communicating information and command selections to processor 504. Another type of entity input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518 that carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A method comprising:
  obtaining click track data for a plurality of users by tracking user click paths through an online interface;
  collecting publicly observable attributes of each user based on their interactions with the online interface, and collecting non-publicly observable attributes of each user, the non-publicly observable attributes comprising at least self-reported data from the user from one or more responses of the user to screening questions of one or more online surveys taken by the user;

filtering the click track data based on the publicly observable and non-publicly observable attributes;

enumerating, in an aggregated format, distinct filtered click paths of the users based on the filtered click track data; and presenting, within a testing interface, an interactive representation of the distinct filtered click paths for exploring different insights and metrics within the represented click paths.

2. The method of claim 1, further comprising:
analyzing the distinct filtered click paths to derive one or more insights and metrics regarding usability and user behavior.

3. The method of claim 1, further comprising:
presenting, within the testing interface, a path explorer configured to display the distinct filtered click paths based on different user attributes and behaviors without displaying every different click path at once, wherein the distinct filtered click paths are presented based at least in part on success in completing a specified task.

4. The method of claim 1, further comprising:
updating the progress of the path exploration and adapting visualizations based on one or more steps selected by researchers.

5. The method of claim 1, further comprising:
displaying, within the testing interface, one or more recommended actions based on the analysis of the distinct filtered click paths.

6. The method of claim 1, further comprising:
dynamically adjusting the granularity of the aggregated format for distinct filtered click paths based on the complexity of user interactions and behaviors.

7. The method of claim 1, further comprising:
providing an option within the testing interface to focus on specific segments of the distinct filtered click paths for in-depth analysis.

8. The method of claim 1, further comprising:
customizing the testing interface to allow a researcher to define and apply their own criteria for filtering and displaying distinct click paths.

9. The method of claim 1, further comprising:
automatically generating visualizations that highlight patterns and trends within the distinct filtered click paths for efficient analysis.

10. The method of claim 1, further comprising:
incorporating machine learning algorithms to identify correlations between certain click paths and user attributes and to provide automated insights.

11. The method of claim 1, further comprising:
implementing a generative artificial intelligence (AI) system to generatively create a set of distinct interface elements for the online interface; and
tracking and analyzing user interactions with the different interface elements to derive insights and metrics related to optimal user paths through the online interface.

12. The method of claim 10, wherein the generative AI system adapts its generation of interface elements based on real-time feedback from user click paths, continuously optimizing for improved usability.

13. The method of claim 1, further comprising:
providing a search functionality within the testing interface to locate specific user interactions or patterns within the distinct filtered click paths.

14. The method of claim 1, further comprising:
providing a replay feature within the testing interface, allowing researchers to review specific user sessions corresponding to distinct filtered click paths.

15. A system comprising:
at least one device including a hardware processor;
the system being configured to perform operations comprising:
obtaining click track data for a plurality of users by tracking user click paths through an online interface;
collecting publicly observable attributes of each user based on their interactions with the online interface, and
collecting non-publicly observable attributes of each user, the non-publicly observable attributes comprising at least self-reported data from the user from one or more responses of the user to screening questions of one or more online surveys taken by the user;
filtering the click track data based on the publicly observable and non-publicly observable attributes;
enumerating, in an aggregated format, distinct filtered click paths of the users based on the filtered click track data; and
presenting, within a testing interface, an interactive representation of the distinct filtered click paths for exploring different insights and metrics within the represented click paths.

16. The system of claim 15, further comprising:
generating automated reports summarizing key insights and metrics derived from the analysis of distinct filtered click paths for usability assessments.

17. The system of claim 15, further comprising:
applying statistical analysis techniques to validate the significance of observed patterns and insights within the distinct filtered click paths.

18. The system of claim 15, further comprising:
utilizing natural language processing algorithms to extract actionable recommendations from the analysis of distinct filtered click paths.

19. The system of claim 15, further comprising:
integrating user feedback mechanisms within the testing interface to gather qualitative insights complementing the quantitative analysis of distinct filtered click paths.

20. A non-transitory computer-readable medium containing instructions comprising:
obtaining click track data for a plurality of users by tracking user click paths through an online interface;
collecting publicly observable attributes of each user based on their interactions with the online interface, and
collecting non-publicly observable attributes of each user, the non-publicly observable attributes comprising at least self-reported data from the user from one or more responses of the user to screening questions of one or more online surveys taken by the user;
filtering the click track data based on the publicly observable and non-publicly observable attributes;
enumerating, in an aggregated format, distinct filtered click paths of the users based on the filtered click track data; and presenting, within a testing interface, an interactive representation of the distinct filtered click paths for exploring different insights and metrics within the represented click paths.

\* \* \* \* \*